May 12, 1925.
P. LEVESQUE
1,537,477
BRAKE AND CLUTCH CONTROL FOR MOTOR VEHICLES
Filed Dec. 1, 1924
2 Sheets-Sheet 1
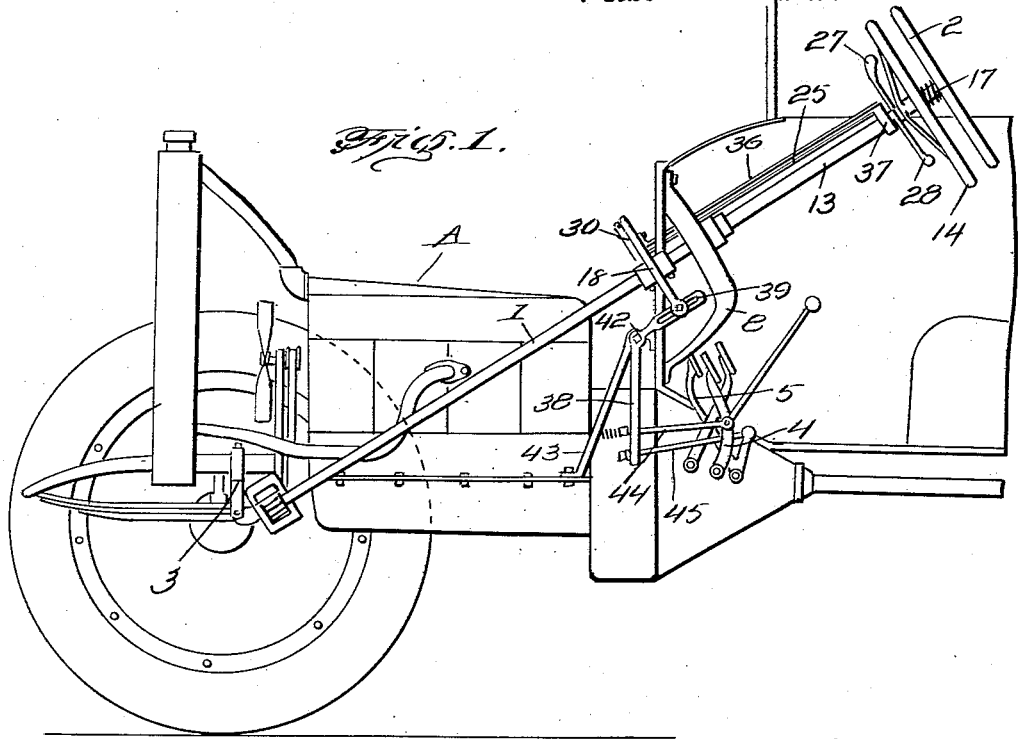
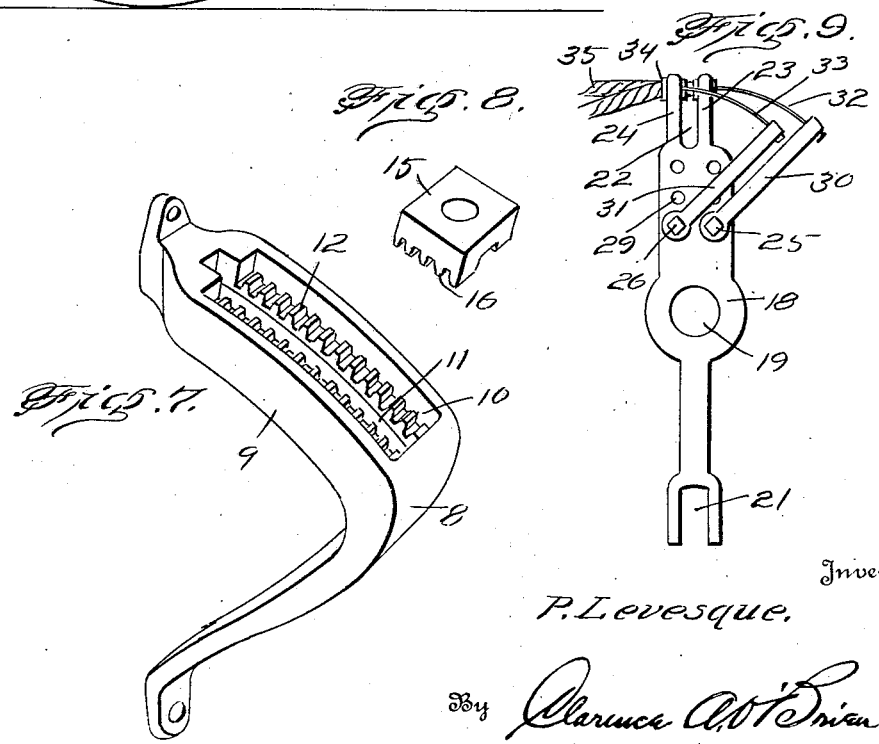
Inventor
P. Levesque,
By Clarence A. O'Brien
Attorney May 12, 1925.  
P. LEVESQUE  
1,537,477  
BRAKE AND CLUTCH CONTROL FOR MOTOR VEHICLES  
Filed Dec. 1, 1924  2 Sheets-Sheet 2
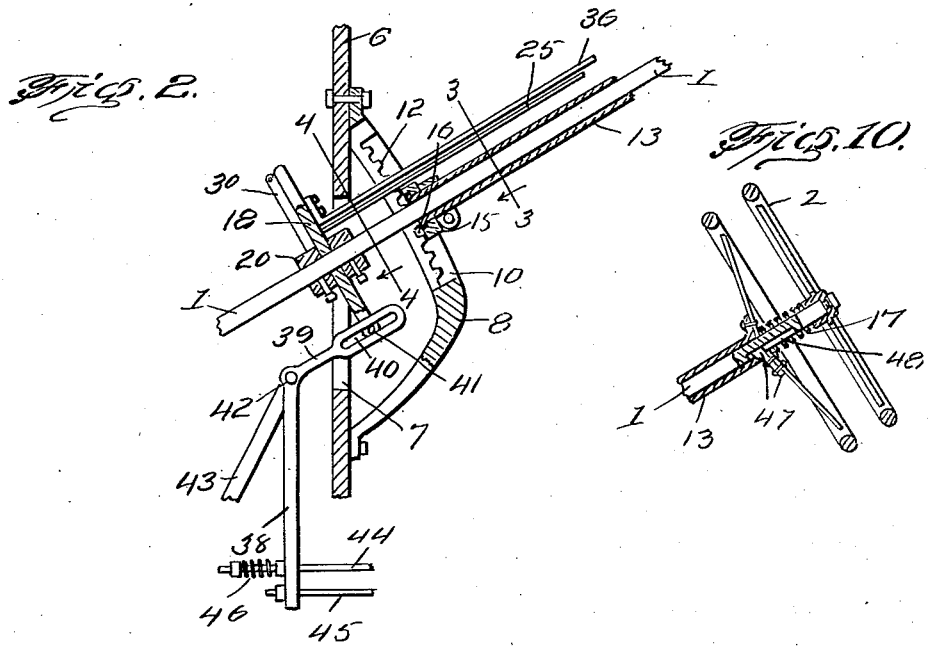
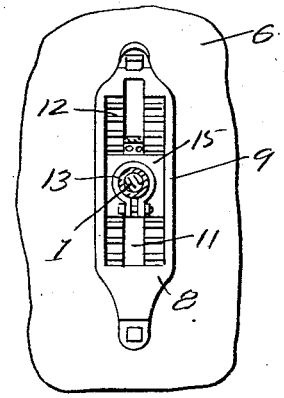
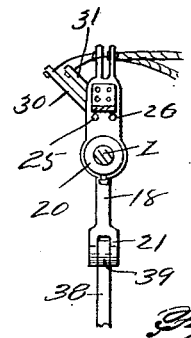
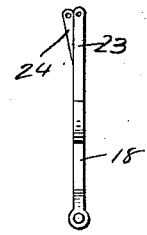
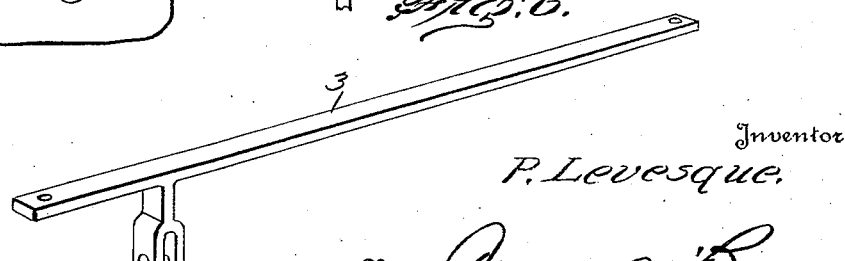
Inventor  
P. Levesque,  
By Clarence A. O'Brien  
Attorney Patented May 12, 1925.

1,537,477

UNITED STATES PATENT OFFICE.

PIERRE LEVESQUE, OF CHICAGO, ILLINOIS.

BRAKE AND CLUTCH CONTROL FOR MOTOR VEHICLES.

Application filed December 1, 1924. Serial No. 753,235.

*To all whom it may concern:*

Be it known that I, PIERRE LEVESQUE, a citizen of the United States, residing at Chicago, in the county of Cook and State of Illinois, have invented certain new and useful Improvements in a Brake and Clutch Control for Motor Vehicles, of which the following is a specification.

This invention relates to a highly novel means for facilitating the actuation of the clutch and brake mechanism of the motor vehicle without necessitating the use of the feet.

Another important object of the invention is to provide a device of the above mentioned character, which is adapted to be associated with the steering post and steering wheel whereby the operator may easily and efficiently control the actuation of the mechanism.

A further object of the invention is to provide a device of the above mentioned character, wherein means is provided for locking the mechanism in various positions, the steering post being adapted for vertical swinging movement in order to facilitate the operation of the mechanism.

A further object is to provide a device of the above mentioned character, which is simple in construction, inexpensive, strong and durable and furthermore adapted for the purposes for which it is designed.

Other objects and advantages of this invention will become apparent during the course of the following description.

In the accompanying drawing forming a part of this specification and in which like numerals designate like parts throughout the same:

Figure 1 is a side elevation showing the device embodying my invention applied.

Figure 2 is a sectional view of the bracket secured on the dash board showing the locking means associated therewith.

Figure 3 is a sectional view taken approximately on line 3—3 of Figure 2 looking in the direction of the arrows.

Figure 4 is a similar section taken approximately on line 4—4 of Figure 2.

Figure 5 is a side elevation of the arm.

Figure 6 is a detail perspective view of the bracket for supporting the forward end of the steering post.

Figure 7 is a detail of the bracket having the segmental rack teeth associated therewith.

Figure 8 is a detail perspective view of the locking member.

Figure 9 is a front elevation of the arm on an enlarged scale, and

Figure 10 is a detail of the upper ends of the steering post and casing respectively, showing the wheels mounted thereon, and the locking means associated therewith.

In the drawings, wherein for the purpose of illustration is shown the preferred embodiment of my invention, the numeral 1 designates the steering post of a motor vehicle, the usual steering wheel 2 being associated with the upper end of the steering post. A bracket such as is shown at 3 with reference more particularly to Figure 6 of the drawing provides a means for supporting the forward end of the steering post in position on the automobile A so that the same may cooperate with the usual steering mechanism in the well known manner. The clutch and brake foot levers of the automobile are illustrated at 4 and 5 respectively. The dash board 6 of the motor vehicle A is provided with an elongated slot 7 and the purpose thereof will hereinafter be more fully described.

An angular bracket 8 is adapted to be secured at its upper and lower free end on the dash board 6 directly over the slot 7 and the upper portion 9 of the bracket 8 is provided in its upper face with the cut out portion 10. A longitudinally extending slot 11 is formed in the cut out portion 10 and is in registry with the slot 7 as clearly shown in Figure 3. A series of rack teeth 12 are arranged in the bottom of the cut out portion 10 on each side of the slot 11 and the purpose thereof will hereinafter be more fully described.

An elongated tubular casing 13 is disposed over the upper portion of the steering post 1 and adapted for sliding movement thereon, the wheel 14 is associated with the upper end of the casing 13 and is located adjacent the steering wheel 12 as clearly illustrated in Figure 1. A key 47 is carried by the wheel 14 and operates in a longitudinally extending slot 48 provided in the upper portion of the steering post 1 so that the wheels rotate simultaneously with the rotation of the steering post and tubular casing respectively.

A locking member 15 is rotatably supported on the lower end of the casing 13 and the bottom of the locking member is provided with the teeth 16 for locking engagement with the rack teeth 12, it being understood of course that the locking member 15 is of such construction as to permit the same to operate within the cut out portion 10 of the angular bracket 8. The teeth 16 of the locking member 15 are normally held in engagement with the rack teeth 12 by means of the coil spring 17 which encircles the upper portion of the steering post 1 and is disposed between the steering wheel 2 and the wheel 14.

An arm 18 has its intermediate portion 19 provided with an opening whereby the same may be placed on the steering post 1 and the arm is secured against sliding movement on the post by means of the locking collars 20 which are secured on the steering post 1 on each side of the arm 19 as more clearly illustrated in Figure 2. The arm 18 is located below the upper portion 9 of the angular bracket 8 and the lower end of the arm which is forked as illustrated at 21 is disposed through the slot 7 provided in the dash board 6. The upper portion of the arm 18 is bifurcated as illustrated at 22 to provide the pair of legs 23 and 24 respectively. The legs are disposed in such a manner as not to be in the same vertical plane as more clearly illustrated in Figure 5 and the purpose thereof will be presently apparent. The upper end of each of the legs is provided with an opening as also clearly shown in Figure 5.

A pair of elongated rods 25 and 26 respectively extending longitudinally adjacent the tubular casing 13 and the upper ends of the rods have associated therewith the hand levers 27 and 28 respectively. The lower ends of the rods extend through suitable openings 29 provided in the upper portion of the arm 18 and carried by the lower ends of the rods on the bottom face of the arm 18 are the levers 30 and 31 respectively. The usual wires which connect the levers 30 and 31 to the carburetor and magneto of the automobile are illustrated at 32 and 33 respectively. The wires are adapted to extend through suitable bushings 34 supported in the openings provided in the upper ends of the legs 23 and 24 and tubing 35 is provided for each of the wires as clearly illustrated in Figure 9. The levers 27 and 28 which are disposed adjacent the hand wheel 14 form the usual gas and spark control and as the same are well known in the art, a further detailed description is not thought necessary. A brace 36 is associated with the arm 18 at its lower end and the upper end of the brace 36 is associated with the upper end of the tubular casing 13 by means of the collar 37.

A lever 38 is provided at its upper end with the angular extension 39 and the latter is provided with a longitudinally extending slot 40 which cooperates with a pin 41, the latter extending through the lower forked end 21 of the arm 18. It is of course to be understood that the outer end of the extension 39 is disposed in the forked end of the arm as more clearly illustrated in Figure 4. The lever 38 is pivotally supported as at 42 on a pin which extends laterally from the upper end of a bracket 43. The lower end of the lever 38 is connected to the clutch and brake foot levers by means of the connections 44 and 45 respectively. A coil spring 46 is associated with the forward end of the connection 44 for the purpose of keeping the clutch disengaged when not in use, and permits the brakes to be applied without moving the clutch control.

When the hand wheel 14 is grasped together with the steering wheel 2 and is moved upwardly against the tension of the coil spring 17, the lock 15 will become disengaged from the rack teeth 12 and by moving the steering post upwardly through the registering slots 7 and 11, the arm 18 will cause the movement of the lever 38 in such a direction as to facilitate the release of the brakes. By lifting the control completely up, the clutch will become engaged and the automobile may be readily started. By moving the steering post 1 in a downward direction, the lever 38 is actuated through the medium of the arms 18 so as to cause the brake lever 5 to be actuated for applying the brakes. It is of course to be understood that the forward end of the steering post 1 is swivelly supported on the bracket 3 in order to facilitate the swinging movement of the same in a vertical plane. When pressure on the wheel 14 is released, the spring 17 will return the locking member 15 in its normal position.

The teeth 16 on the locking nut 15 when in engagement with the rack teeth 12 will hold the steering post 1 in any desired position against accidental swinging movement in either an upward or downward direction.

The provision of an apparatus of the above mentioned character enables the clutch and brake pedals respectively to be controlled entirely by hand without causing any discomfort to the operator in obviating the necessity of having to actuate the clutch and brake mechanism by a foot as is commonly done. The simplicity in which my device is constructed enables the parts to be readily assembled and associated with motor vehicles without necessitating any material alteration of the vehicle.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. In combination with a motor vehicle including the steering post, the steering wheel and the clutch and brake levers thereof, of means for facilitating the upward and downward swinging movement of the steering post, and additional means cooperating with the aforementioned means for automatically actuating said levers depending upon the direction in which the steering post is moved.

2. In combination with a motor vehicle including the steering post, the steering wheel, and the clutch and brake levers thereof, said steering post being adapted for upward and downward swinging movement, means for automatically actuating the levers dependent upon the direction in which the steering post is moved, and means for normally locking the steering post against movement.

3. In combination with a motor vehicle including the steering post, the steering wheel, the clutch and brake levers thereof, said steering post adapted for upward and downward swinging movement, a casing around the upper portion of the steering post, a hand wheel associated with the upper end of the casing and normally spaced below the steering wheel, means associated with the steering post and said levers for automatically actuating the latter when the steering post is moved in either direction, and means cooperating with the casing for locking the steering post against swinging movement.

4. In combination with a motor vehicle including the steering post, the steering wheel, the clutch and brake levers thereof, said steering post adapted for upward and downward swinging movement, a casing around the upper portion of the steering post, a hand wheel associated with the upper end of the casing and normally spaced below the steering wheel, means associated with the steering post and said levers for automatically actuating the latter when the steering post is moved in either direction, means cooperating with the casing for locking the steering post against swinging movement, said last mentioned means comprising a slotted bracket supported on the dash board of the vehicle and through which the steering post extends, rack teeth on the slotted bracket, and a toothed member carried by the lower end of the casing cooperating with the rack teeth.

5. In combination with a motor vehicle including the steering post, the steering wheel, the clutch and brake levers thereof, said steering post adapted for upward and downward swinging movement, a casing around the upper portion of the steering post, a hand wheel associated with the upper end of the casing and normally spaced below the steering wheel, means associated with the steering post and said levers for automatically actuating the latter when the steering post is moved in either direction, means cooperating with the casing for locking the steering post against swinging movement, said last mentioned means comprising a slotted bracket supported on the dash board of the vehicle and through which the steering post extends, rack teeth on the slotted bracket, a toothed member carried by the lower end of the casing cooperating with the rack teeth, and a coil spring disposed between the steering wheel and the hand wheel for normally holding the toothed locking member in engagement with the rack teeth.

6. In combination with a motor vehicle including the steering post, the steering wheel, and the clutch and brake levers thereof, said steering post being adapted for upward and downward swinging movement, an arm secured on said steering post, a pivoted lever connected at its lower end with the clutch and brake levers respectively, an angular extension formed on the upper end of the lever, said extension being provided with a longitudinal slot, the lower end of said arm being secured to the slotted portion of the angular extension, whereby the levers will be actuated when the steering post is moved upwardly or downwardly.

7. In combination with a motor vehicle including the steering post, the steering wheel, and the clutch and brake levers thereof, said steering post being adapted for upward and downward swinging movement, an arm secured on said steering post, a pivoted lever connected at its lower end with the clutch and brake levers respectively, an angular extension formed on the upper end of the lever, said extension being provided with a longitudinal slot, the lower end of said arm being secured to the slotted portion of the angular extension, whereby the levers will be actuated when the steering post is moved upwardly or downwardly, and means for locking the steering post against swinging movement.

In testimony whereof I affix my signature.

PIERRE LEVESQUE.